United States Patent
Barnett et al.

(10) Patent No.: US 12,456,058 B2
(45) Date of Patent: Oct. 28, 2025

(54) SEMANTIC-TAXONOMY-BASED IMMUTABLE LEDGER REQUEST EVALUATION

(71) Applicant: Dell Products L.P., Round Rock, TX (US)

(72) Inventors: Alan Barnett, County Cork (IE); Matthew Keating, Cork (IE); Merry Globin, County Cork (IE)

(73) Assignee: Dell Products L.P., Round Rock, TX (US)

( * ) Notice: Subject to any disclaimer, the term of this patent is extended or adjusted under 35 U.S.C. 154(b) by 103 days.

(21) Appl. No.: 18/430,821

(22) Filed: Feb. 2, 2024

(65) Prior Publication Data
US 2025/0252321 A1    Aug. 7, 2025

(51) Int. Cl.
*G06N 5/02* (2023.01)
*G06F 21/55* (2013.01)
*G06F 40/30* (2020.01)

(52) U.S. Cl.
CPC ............. *G06N 5/02* (2013.01); *G06F 21/552* (2013.01); *G06F 40/30* (2020.01); *G06F 2221/034* (2013.01)

(58) Field of Classification Search
CPC ......... G06N 5/02; G06F 21/552; G06F 40/30; G06F 2221/034
See application file for complete search history.

(56) References Cited

U.S. PATENT DOCUMENTS

| | | | |
|---|---|---|---|
| 11,563,590 B1* | 1/2023 | Bowen | H04L 9/3247 |
| 12,093,301 B1* | 9/2024 | Vasudeva | G06F 16/116 |
| 2006/0041423 A1* | 2/2006 | Kline | G06F 11/3676 704/9 |
| 2006/0265689 A1* | 11/2006 | Kuznetsov | G06F 9/546 717/117 |
| 2009/0328215 A1* | 12/2009 | Arzi | H04L 63/1416 726/23 |
| 2015/0370782 A1* | 12/2015 | Fan | G06F 40/30 704/9 |
| 2018/0004800 A1* | 1/2018 | Chow | G06F 16/9027 |
| 2018/0137505 A1* | 5/2018 | Soppitt | G06Q 20/40 |
| 2019/0171756 A1* | 6/2019 | Patavardhan | G06F 21/6227 |
| 2019/0325074 A1* | 10/2019 | Ghezzi | G06F 9/547 |
| 2020/0371832 A1* | 11/2020 | Baset | H04L 9/0643 |
| 2023/0359604 A1* | 11/2023 | Doney | G06Q 20/367 |
| 2025/0086212 A1* | 3/2025 | Minooei | G06N 20/00 |

\* cited by examiner

*Primary Examiner* — Darren B Schwartz
(74) *Attorney, Agent, or Firm* — Krishnendu Gupta; Derek Lam

(57) ABSTRACT

Techniques are disclosed for evaluating immutable ledger requests using a semantic taxonomy. An example system includes a memory comprising instructions, and a processor configured to execute the instructions. Example instructions include providing a semantic taxonomy of semantically linked terms and phrases; using the semantic taxonomy to validate input fields of requests for immutable ledger transactions according to one or more predefined templates; and submitting the validated requests to an immutable ledger.

20 Claims, 5 Drawing Sheets

SEMANTIC-TAXONOMY-BASED IMMUTABLE LEDGER REQUEST EVALUATION

FIELD

Example embodiments generally relate to data management in distributed systems. More specifically, at least some embodiments relate to systems, hardware, software, computer-readable media, and methods for data management to facilitate secure and efficient operation of a distributed immutable ledger.

BACKGROUND

The advent of blockchain technology has revolutionized the way data is stored and transactions are recorded. Blockchains are inherently secure due to their decentralized and immutable ledger systems. These features, while providing numerous benefits such as transparency and resistance to data tampering, also present unique challenges. The technology has been widely adopted across various sectors, including finance, supply chain management, and digital identity verification. In the context of data management, blockchains utilize complex data structures and request handling mechanisms to ensure the integrity and authenticity of the data being added to the ledger.

SUMMARY

Techniques are disclosed for evaluating immutable ledger requests using a semantic taxonomy.

In one embodiment, a system includes a memory having instructions; and a processor configured to execute the instructions. The instructions include: providing a semantic taxonomy of semantically linked terms and phrases; using the semantic taxonomy to validate input fields of requests for immutable ledger transactions according to one or more predefined templates; and submitting the validated requests to an immutable ledger.

In some embodiments, the semantic taxonomy uses a semantic graph. The input fields of the requests can be validated against the semantic taxonomy using semantic links within the taxonomy to determine a context and meaning of phrases within the requests. Validating the input fields of the requests can prevent placement of illegal content or malicious data onto the immutable ledger by enforcing use of the predefined templates. Validating the input fields of the requests can include ensuring compliance with the predefined templates. The requests can be received via an application programming interface. The requests can include text fields populated with strings. The input fields can be validated by verifying the strings against the semantic taxonomy. The instructions can further include dynamically updating messages in the requests based on real-time changes in associated data. The semantic taxonomy can be structured using a Resource Description Framework (RDF) that is extensible and supports interoperability with external datasets or knowledge bases. The semantic taxonomy can be configured to maintain contextual relationships between elements in the taxonomy to generate semantically coherent messages. The semantic taxonomy can be extensible to include new nodes, relationships, or substructures without database rebuilding. The system can be configured as middleware or a module that is interoperable with various immutable ledger architectures. The immutable ledger can be a blockchain. The immutable ledger can be distributed.

Other example embodiments include, without limitation, apparatus, systems, methods, and computer program products comprising processor-readable storage media.

Other aspects will be apparent from the following detailed description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the drawings.

DETAILED DESCRIPTION

Figure 1:
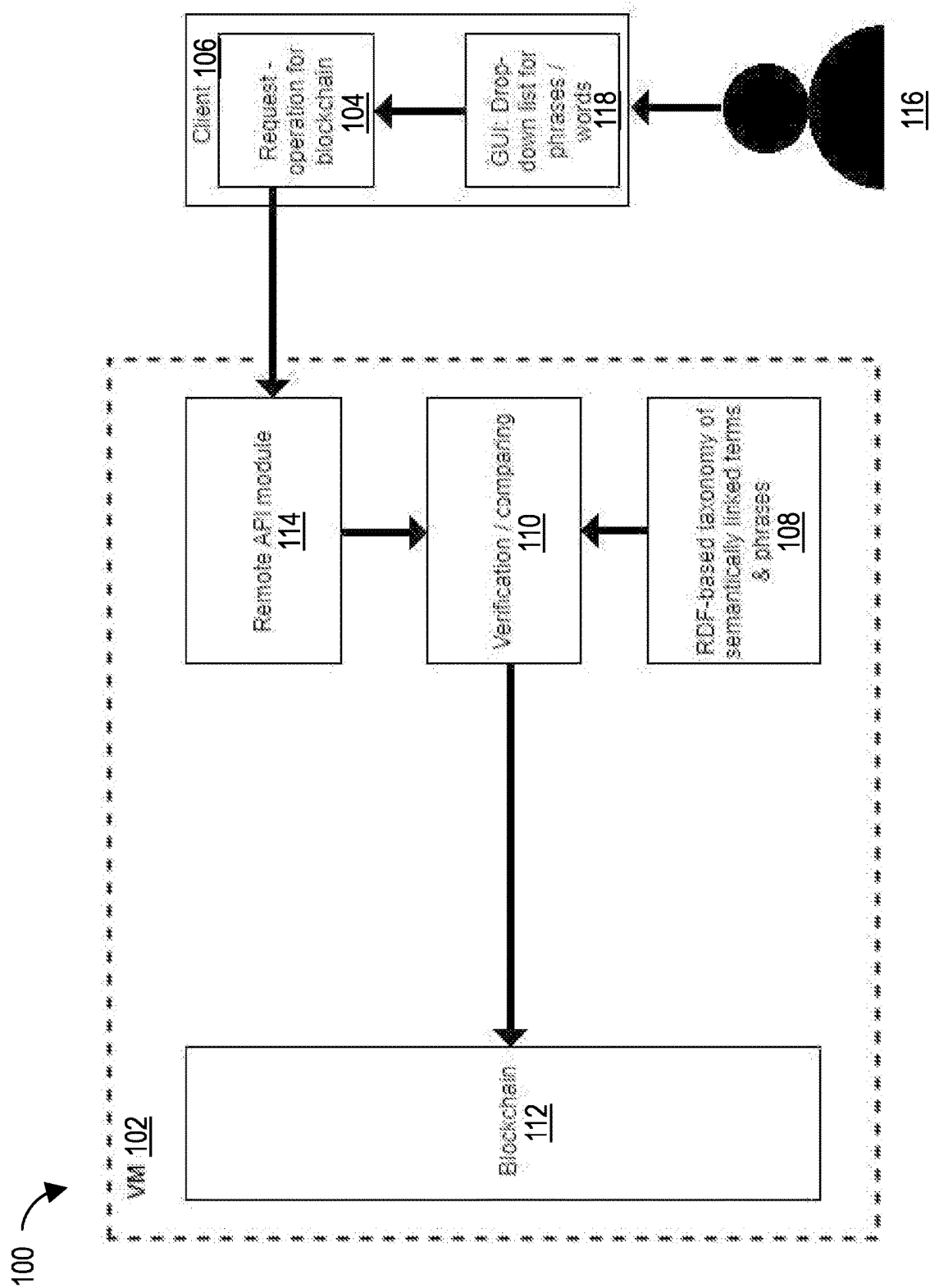
FIG. 1 discloses aspects of an example request evaluation system, in accordance with illustrative embodiments.

Example embodiments generally relate to data management in distributed systems. More specifically, at least some embodiments relate to systems, hardware, software, computer-readable media, and methods for data management to facilitate secure and efficient operation of a distributed immutable ledger.

Disclosed herein are techniques for request evaluation using a semantic taxonomy. Example embodiments leverage a semantic-taxonomy-based text templating system usable to replace fully customizable text fields such as description fields in blockchain request headers, with a templated messaging system. Advantageously, the disclosed templated messaging techniques resolve vulnerabilities in distributed immutable ledgers such as blockchain while still preserving usability by allowing users to write custom messages using the present templating system.

Blockchain technology, while providing a robust platform for secure transactions, has faced challenges with the management of content within its immutable ledger. Conventional approaches to content regulation on blockchains have been limited due to the decentralized nature of the technology. The inability to alter or remove data once it is added to the blockchain poses significant risks, particularly when it comes to the inadvertent or malicious addition of illegal or sensitive content.

Although conventional hard forks can theoretically retroactively address issues, these are drastic measures that can disrupt the network and are not always feasible or effective. Additionally, property graphs can be employed to manage data, but property graphs can lack the scalability, extensibility, and interoperability required for effective blockchain content regulation.

The present solution addresses an open issue in the blockchain space, specifically the uploading of illegal content or other malicious data. Such content can presently be uploaded to the blockchain via an exploit that uses free-form editable text fields in request headers. The immutability of the blockchain drastically worsens the impact of this issue, along with the blockchain's decentralization. Real-world occurrences of this blockchain platform abuse have occurred on various pertinent contemporary blockchain platforms. Conventional methods to combat illegal image content exist, but it is nearly impossible for current methods to identify leaked personally identifying information (PII) or other sensitive data, especially if it was leaked covertly and recently. Leaked PII, by nature, may also appear like "normal" data added to the blockchain, such as fund transfer descriptions.

In example embodiments, using semantic graphs to underpin a solution that counteracts the placement of leaked personal data on blockchain platforms and offers strong guarantees of blocking all illegal content is a unique advantage provided by the disclosed techniques.

More responsibility is being placed on online services regarding dealing with illegal content. Governments such as the United Kingdom, and larger unions such as the European Union have passed laws such as the EU Digital Services Act that increases responsibilities and consequences for services that harbor illegal activity. This means lower tolerance for entities who do not rapidly address such content, and do not take appropriate action against it.

The legislation is likely to apply to services operating in any regions that pass such laws. The disclosed techniques address distributed immutable ledgers in some implementations, such as blockchain, since these ledgers are likely to have a difficult time removing illegal content from their systems and responding effectively to illegal content. Blockchain covers many domains, e.g., cryptocurrencies, internet connected vehicles, automotive, and more. Accordingly, the applicability of the present request evaluation spans these industries and could be useful for companies that do not need freely editable text fields for their services, but still wish to allow the user to write descriptions or messages. One incentive addressed is legal compliance, as well as cybersecurity. Reasonably, many companies will prioritize solving this issue using a variety of solutions including the techniques discussed herein.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A. Context for an Example Embodiment

The following is a discussion of a context for example embodiments. This discussion is not intended to limit the scope of the invention, or the applicability of the embodiments, in any way.

A.1. Request Evaluation

Conventional blockchain-based request evaluation approaches are reactive and typically come in the form of a "hard fork" to adjust to blockchain when problems reach a critical mass. Theoretically such a hard fork could be carried out to purge a blockchain of illegal content, though no such hard fork has been carried out exclusively for this purpose at present. Moreover, there are currently no conventional general approaches that are effective to combat recently leaked personal identifying information being placed on a blockchain.

Some components outlined herein have been used conventionally for other purposes including, for example, templating systems for communication in online services with social components, these including pre-fabricated messages that can be sent to other users. These scenarios typically use templating to avoid unwanted message terms or words being sent via free-form text fields, for example on a child's videogame that allows communication with other users. However, these conventional approaches are not semantically linked or backed by graph technologies. In contrast, these conventional technologies are usually custom-built software that operates as part of the respective application.

Advantageously, the present request evaluation is operable as a plugin or extension module configured to operate alongside, or as part of the blockchain API, while leaving the underlying blockchain system as-is. The present design promotes vendor agnosticism, meaning the present techniques work with any blockchain architecture once the freely editable request field of the API is mapped to the present request evaluation so that incoming requests can be checked.

It is appreciated that property graphs could also be considered for underpinning a solution to address illegal content on blockchain. There are a few fundamental differences when using a semantic graph instead of a property graph, and one graph could perform better than the other depending on the specific scenario. For example, property graphs allow for attachment of properties to edges and vertices, these properties could be useful for purposes such as attaching translations to different languages to a node. Property graphs also have no fixed schema, provide fast graph traversal, relationships within are directional, and each implementation typically uses its own querying language.

Generally, semantic graphs are better suited to slower-changing data, semantic graphs are better standardized, more interoperable, and avoid vendor lock-in. Advantageously, semantic graphs allow for a more interoperable design in contrast to using property graphs. Some interesting features may need to be addressed as well, for example, language translations would have their own separate graph or node.

A.2. Technical Problems

Blockchain providers face a technical problem in which freely editable request header fields are being abused to place illegal content on the blockchain, such as leaked personal data or image bits of illegal images. Once this content is on the blockchain, it is extremely difficult to remove due to the immutable nature of the blockchain. The blockchain also propagates this content to anyone running a full-node of a given blockchain.

A.2.1. Malicious Code Distribution

The above content issue, while extremely serious, does not represent the full picture. This ongoing issue could easily be exploited as a security vulnerability by abusing the freely editable header fields by inserting malicious code or commands in them, and subsequently on to the blockchain. For example, in such a scenario the blockchain's distributed nature effectively acts as a distribution mechanism to move this malicious code to many machines, and this vulnerability could reasonably act as a back-door patching mechanism for malware.

A.2.2. Infrastructure Vulnerabilities

This content issue could also possibly directly exploit underlying infrastructure vulnerabilities, for example where SQL (structured query language) databases backend blockchain explorer UIs (user interfaces) that process blockchain info, it is reasonable to suggest that such a system processing a maliciously crafted SQL command in one of these customizable header text fields could become compromised.

A.3. Advantages

The disclosed techniques are relevant to blockchains, specifically in their vulnerability to the placement of illegal content. Accordingly, example embodiments can have a significant impact in addressing this vulnerability without compromising usability.

Example embodiments use semantic graphs to form a mechanism for stopping illegal content from reaching the blockchain. Some embodiments sit between the user and the blockchain, in the form of a middleware or module. This architecture allows the present request evaluation to be relatively interoperable with a variety of blockchains, since the integration process would consist only of API mapping. This API mapping is a trivial effort compared to the effort of removing illegal content from the blockchain.

Removing illegal content from blockchains happens via a hard-fork. This involves fundamentally changing the blockchain and the validation, and invalidation of chosen blocks, which could be used to remove illegal content. Conventionally, hard-forks have been used for purposes like applying urgent security patches. No hard forks have been used expressly to address illegal content on a blockchain. Multiple pertinent blockchain providers currently hold several unwanted illegal content items on their blockchains, and these have remained unaddressed for several years. Lack of initiative to combat the problem will change with new legislation addressing illegal content legislation in geographies such as the European Union (e.g., the Digital Services Act) and United Kingdom (Online Safety Bill) that will place increased responsibility on online services to combat illegal content, and put pressure on blockchain platforms to act. The lack of initiative also shows that fixing the issue is not simple once illegal content is already on a blockchain, thus illustrating the need for the disclosed techniques as a preventative measure.

Advantageously, the present request evaluation provides the auxiliary function of showcasing that a platform is engaged in the fight against illegal content on online services. More than mere branding or optics, this showcasing could be important to demonstrate that a company took reasonable measures to stop illegal content issues from affecting their platform. This demonstration could be of legal importance in terms of legislative compliance. The disclosed solution offers visible techniques to address illegal content on online services. However, conventional request evaluation is not appropriate for blockchains, or in the case of conventional analytical solutions does not provide strong guarantees that absolutely no illegal content will end up on the blockchain (the issue thereafter being how difficult removing even one illegal item from blockchain is). The present techniques address the blockchain use case, and as mentioned also demonstrate efforts at compliance with legislation.

B. Overview of Aspects of an Example Embodiment

B.1. Introduction

Disclosed herein are technical solutions to technical problems involving illegal content and malicious code that can be placed on blockchain, due to an issue with freely editable request headers, exacerbated by the immutability and decentralization of the blockchain. Example embodiments use a semantic-taxonomy-based solution, for example using semantic graphs configured to leverage RDF (Resource Description Framework). A semantic graph provides several different, favorable aspects when compared with a property-graph-based approach, described in further detail herein.

While it is not possible (or at least extremely difficult) to remove illegal content that already exists on a blockchain without going to extreme measures, it is possible to prevent this kind of abuse of blockchain systems happening in future. Example embodiments leverage a semantic-graph-based text templating system usable to replace fully customizable text fields such as description fields in blockchain request headers, with a templated messaging system. Advantageously, the disclosed templated messaging techniques resolve the vulnerability while still preserving usability by allowing users to write custom messages through the templating system. This can be a preferable choice to simply removing fields such as descriptions entirely from the blockchain API, as a blockchain provider may worry about trade-offs around user friendliness versus security. Advantageously, the disclosed techniques strike a highly secure and user friendly balance.

Example embodiments operate in the context of a distributed immutable ledger such as a blockchain. The disclosed techniques are also operable in other contexts, without departing from the scope of the example embodiments. In the context of the disclosed embodiments, one focus of application in this scenario discussed herein is the resolution of a known issue with these technologies on an immutable ledger, while preserving a high degree of usability (rather than simply eliminating the problematic functionality entirely).

FIG. 1 shows aspects of an example request evaluation system 100, in accordance with illustrative embodiments. In particular, FIG. 1 illustrates the request evaluation system configured to use a virtual machine (VM) 102 to process a request 104 from a client 106.

Example embodiments of the request evaluation system 100 operate as middleware or a module that is interoperable with various blockchain architectures. The present system is designed to prevent placement of illegal content or malicious data onto the blockchain by enforcing the use of predefined templates, thereby complying with legal requirements for online services to combat illegal content. Additionally, the present system provides evidence of efforts to prevent the placement of illegal content on the blockchain for legislative compliance purposes.

In example embodiments, the VM 102 includes a semantic taxonomy 108 and a verification module 110. These components are discussed in further detail herein in the context of the request evaluation system 100.

In one implementation, an example end-to-end flow of events within the present solution includes, but is not limited to, the following:

From the client 106, the user 116 interacts with a blockchain-backed application, e.g., via a web-based user interface (UI) and the like. The user creates a desired transaction via the graphical UI (GUI) 118. For example, the user chooses to add a descriptive message to a transaction header. In response, the client displays a form with phrases. When the user selects a top-level phrase, one or more drop-down lists including an available and a relevant word list are populated for each phrase term. In example embodiments this population process is efficiently generated by leveraging the semantic taxonomy 108, for example using an underlying semantic graph database. The user submits a transaction request, which is passed by the client to the API module 114. The API module verifies an incoming transaction request by running a query through the semantic taxonomy, for example using the underlying semantic graph database, to confirm that the target request header remains unmodified in transit. Once verified, the transaction is submitted to the blockchain 112 by the verification module 110.

C. Detailed Description of Aspects of an Example Embodiment

C.1. Semantic Taxonomy

With reference to FIG. 1, in example embodiments the semantic taxonomy 108 includes an RDF-based taxonomy of semantically linked terms and phrases to underpin the verification mechanism 110 for input fields to the blockchain 112 over API 114. This design ensures the inputs conform to the present templating system's approved set of phrases and words. This structure is extensible and supports interoperability with external datasets or knowledge bases, enhancing the contextual understanding of requests.

Figure 2:
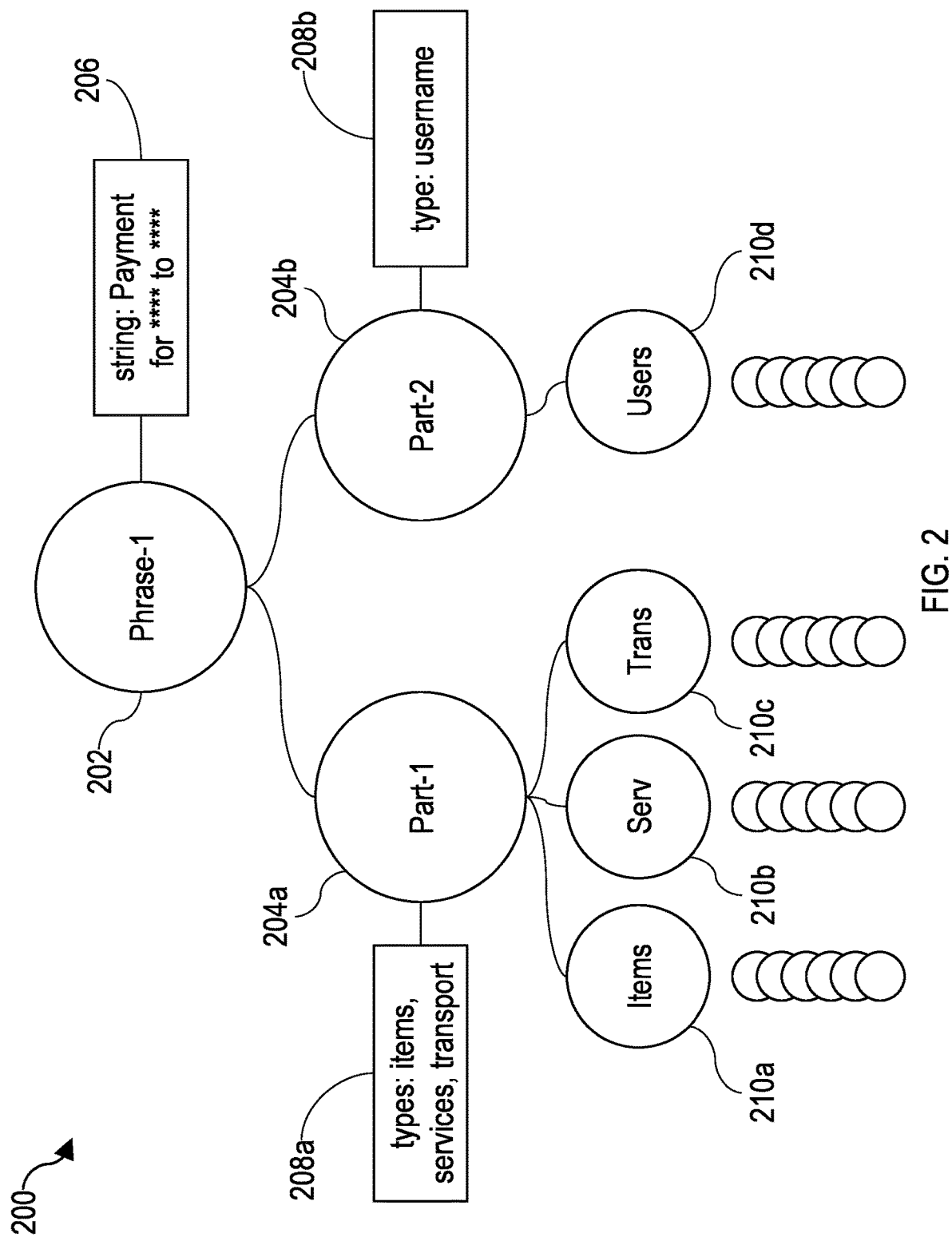
FIG. 2 discloses aspects of an example semantic taxonomy hierarchy, in accordance with illustrative embodiments.

FIG. 2 shows aspects of an example semantic taxonomy hierarchy 200, in accordance with illustrative embodiments. Example embodiments of the hierarchy can include phrases 202 and parts 204a, 204b (collectively, 204).

In one implementation, the present solution leverages a semantic taxonomy as a data structure. Example embodiments of the semantic taxonomy are configured to leverage a taxonomy of "word" and "phrase" elements. The semantic taxonomy defines a categorization of elements within a proposed vocabulary. This semantic taxonomy can be viewed as conceptually similar to a database schema. At the same time, in contrast to a database schema, a vocabulary taxonomy such as the present semantic taxonomy implements a hierarchical or tree-like structure, an example structure being illustrated by the hierarchy 200. Advantageously, this structure allows example embodiments to leverage a custom taxonomy to organize and filter related elements in a logical and efficient manner. An example hierarchical structure of the taxonomy is shown in FIG. 2, and FIG. 3 illustrates the hierarchy in more detail, such as for elements nearer to the leaf nodes.

Figure 3:
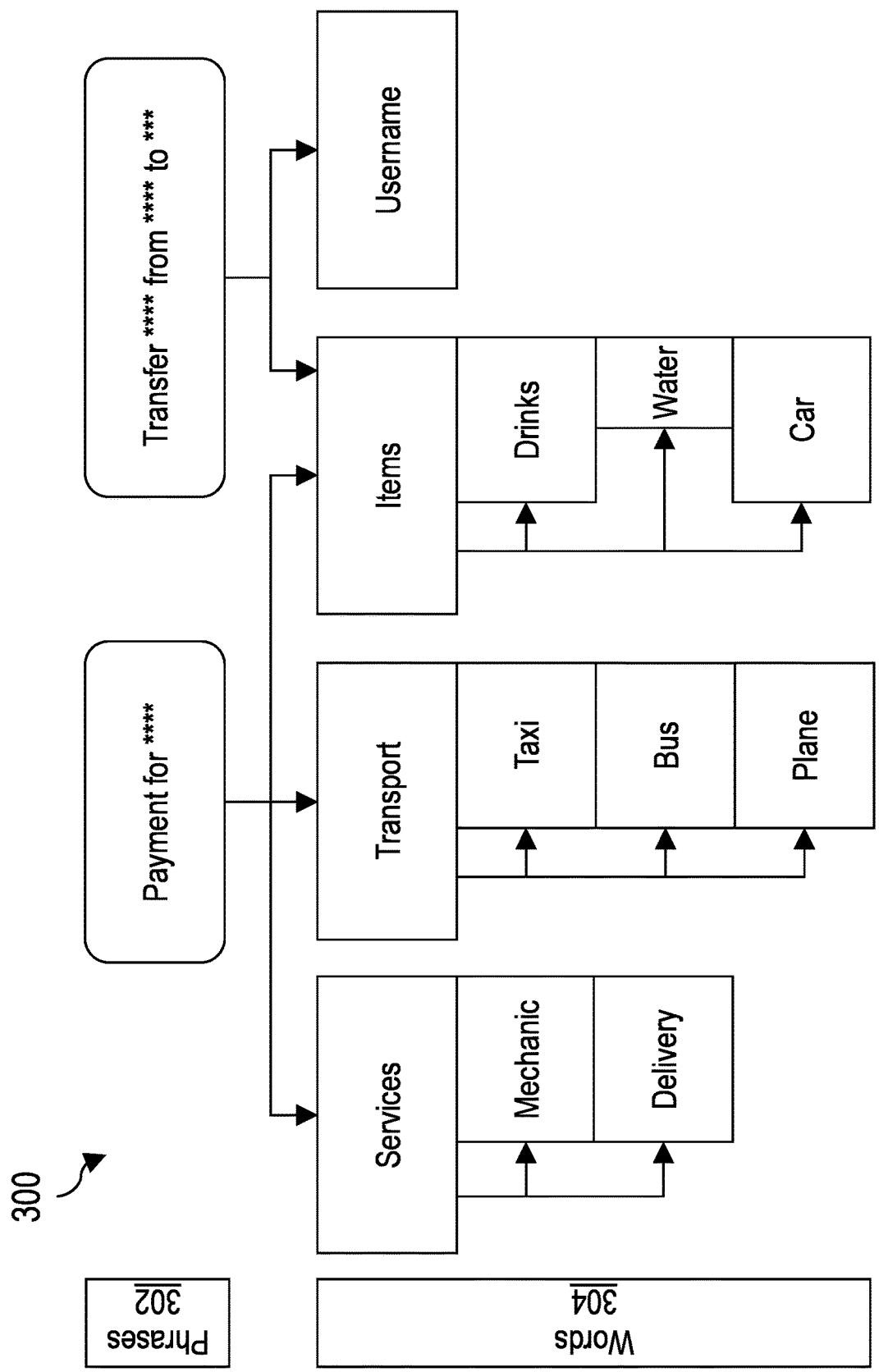
FIG. 3 discloses aspects of example semantic taxonomy contents, in accordance with illustrative embodiments.

With reference to FIGS. 2 and 3, example embodiments of the phrases 202, 302 include a string 206 of words with some placeholder elements. The phrases can be natural language phrases. The placeholder elements are for further customizing the string using template words 304. Example placeholder elements can include, but are not limited to, asterisks or blank elements. In some embodiments the phrases can be formed in accordance with context. For example, since the present system deals with blockchain and distributed ledger header input, the fields are adjustable to cater to explaining transactions or identifying transfers. Example messages 206 can read: "Payment from Bill to Thomas for the tea yesterday" or "Transfer of Asset-1234 from DataSeller-1 to DataBuyer-2 for 20 USD." For example, a templated phrase in the present system could cover these kinds of messages using the following structure: "Payment from *SENDER* to *RECEIVER* for **** on *DD/MM/YYYY*" or "Transfer of *ITEM* from *SENDER* to *RECEIVER* for *AMOUNT* *CURRENCY*."

As shown in FIG. 2, an example hierarchy 200 includes a phrase 202 having a string 206 of words with placeholder elements ("Payment for ** to **"). In the illustrated example, the phrase includes two parts 204a, 204b that correspond to the first and second placeholder elements. In example embodiments, the parts include types 208a, 208b. For example, for the Part-1 204a corresponding to the first placeholder element in the string 206, the types 208a can include items, services and transport. These types are also illustrated in the hierarchy as nodes 210a, 210b, 210c. For the Part-2 204b corresponding to the second placeholder element in the string 206, the type 208b can include username. This type is illustrated in the hierarchy as a node 210d.

FIG. 3 shows aspects of example semantic taxonomy content 300, in accordance with illustrative embodiments. Example content can include phrases 302 and words 304.

With reference to the terms "phrase" and "word" discussed above, FIG. 3 shows example content 300 of a given semantic taxonomy. In one implementation, FIG. 3 further shows a structure of the technical implementation of the present verification module, discussed in further detail herein.

In example embodiments, the content 300 includes a top-level phrase 302. The illustrated phrase 302 includes a one-to-many relationship of words 304 for each phrase. A user-defined level of granularity and customization can be defined and used to extend the taxonomy to allow for use across various domains.

In example embodiments, the content 300 includes words 304. As discussed, placeholder fields with an asterisk are customizable by introducing templated words to fill the blanks. The words 304 can be other pre-defined elements from the semantic taxonomy. These words can act as values that can be assigned to the variables in each phrase, and could contain regular words or be linked to items such as user names and transaction identifiers.

C.2. Verification Module

In example embodiments, the present solution includes a comparison and verification module 110 that leverages the semantic taxonomy 108 of linked terms and phrases to carry out accurate comparisons. The verification module is configured to compare and validate input fields of requests against the taxonomy to ensure compliance with predefined templates. The verification module leverages semantic links within the taxonomy to determine the context and meaning of phrases within the requests, enabling the generation of semantically coherent messages. The verification module is further configured to dynamically update messages based on real-time changes in the data associated with the requests, focusing on specific portions of the taxonomy tree structure relevant to the type of request being processed to reduce search time.

Since elements of phrases are variable, it is noted that a direct comparison is challenging to impossible to perform. Instead, the semantic links within the taxonomy can be used to determine the meaning and context of the phrase being compared, ensuring that the comparison is carried out in a meaningful way. For example, if the opening of the phrase is "Payment," then much of the taxonomy can be ignored for the phrase search, and the specific portion of the taxonomy tree structure which handles payment-related phrases can be focused on. Accordingly, the semantic links help drastically reduce the search time compared to crawling the entire taxonomy. For example, a semantic graph is able to detect and respond to changes in the sender's data, ensuring that the message is updated in real-time, providing a dynamic experience. The customizable variables in a phrase can be loaded with a specific word or piece of information, for example the date or the username of a payment sender. This, too, enables much more efficient searching of the words in the taxonomy since only those words compatible with a given phrase need to be searched, and as discussed, the remaining portions of the taxonomy can be ignored.

With reference to FIG. 1, in example embodiments, the client 106 can present the request evaluation system to an end user 116 in a variety of ways. For example, a graphical user interface 118 can display dropdown menus to select the words and phrases. In alternate embodiments, an API request in code can be made with the text field populated with a string, and if the string passes the verification then the request 104 would be accepted.

C.3. Semantic Graph

One consideration with the present request evaluation is that in some implementations comparisons against the semantic taxonomy could be slow. Accordingly, example embodiments leverage a rapidly traversable semantic graph to underpin the taxonomy. The ability for the present technology to scale well and handle large volumes of data and simple queries efficiently is advantageous in the blockchain use case due to the large number of requests on these services. Another advantage to leveraging a semantic graph is that a semantic graph allows for the maintenance of the contextual relationships between taxonomy elements through semantic links. Use of semantic links ensures that the available vocabulary items used to form a message are semantically coherent, avoiding the creation of incorrect messages in the present templating system.

The reasoning capabilities of the semantic graph allow for validation of the relationships between elements, making sure that the words used in the message make sense and are placed in the correct context. For instance, such validation can ensure that a sender's username is not mistakenly placed where an amount or date should be, ensuring that the message is accurate and meaningful. The taxonomy also caters to special cases such as real usernames and item names or IDs from the underlying blockchain system. Semantic graphs generally function well with larger, infrequently-updated data, which closely describes the taxonomy of words and phrases in the present result evaluation. Further details are disclosed herein regarding use of semantic graphs (e.g., RDF) compared with property graphs (e.g., Labeled Property Graphs) for the disclosed techniques.

A semantic graph is typically more scalable than a property graph for handling large amounts of slow-changing data and performing simple queries efficiently. This scalability is helpful to the disclosed use cases, where there may be large taxonomies or dictionaries underpinning the present solution but the data within these does not rapidly change. Lookups to match text against the taxonomy are also a relatively simple query.

RDF semantic graphs allow adding new nodes and relationships, or even substructures, without requiring rebuilding an associated database. This extensibility and flexibility is beneficial to the present system, where new message formats or events can be seamlessly integrated into the system without disrupting the existing structure.

RDF follows open standards and allows interoperability with other systems and data sources. This interoperability means the disclosed techniques can easily combine external datasets or knowledge bases, enhancing the richness and contextual understanding of the present system. In contrast, interoperability is an issue in property graphs due to lack of standardization that can lead to vendor lock-in. For example, GQL is a possible solution but is still under development, whereas RDF currently has SPARQL that provides a standard for all RDF triple stores. Defined and commonly accepted standards in RDF provide unified views and unambiguous interpretation, and avoids vendor lock-in.

RDF supports reasoning engines that enable logical deductions and inferences based on available data. This reasoning and inference can help dynamically generate personalized messages or provide intelligent suggestions, enhancing the overall performance and experience of the taxonomy. RDF also has inferencing that supports machine intelligence.

Linked data allows for efficient navigation, exploration, and querying of the semantic graph, enabling the present system to retrieve relevant information and generate tailored messages accordingly.

RDF* is a knowledge graph triple store that is currently under development to leverage properties. RDF* allows the disclosed techniques to add properties to any subject, predicate, or object, providing some of the functionality seen in property graphs.

D. Example Methods

Figure 4:
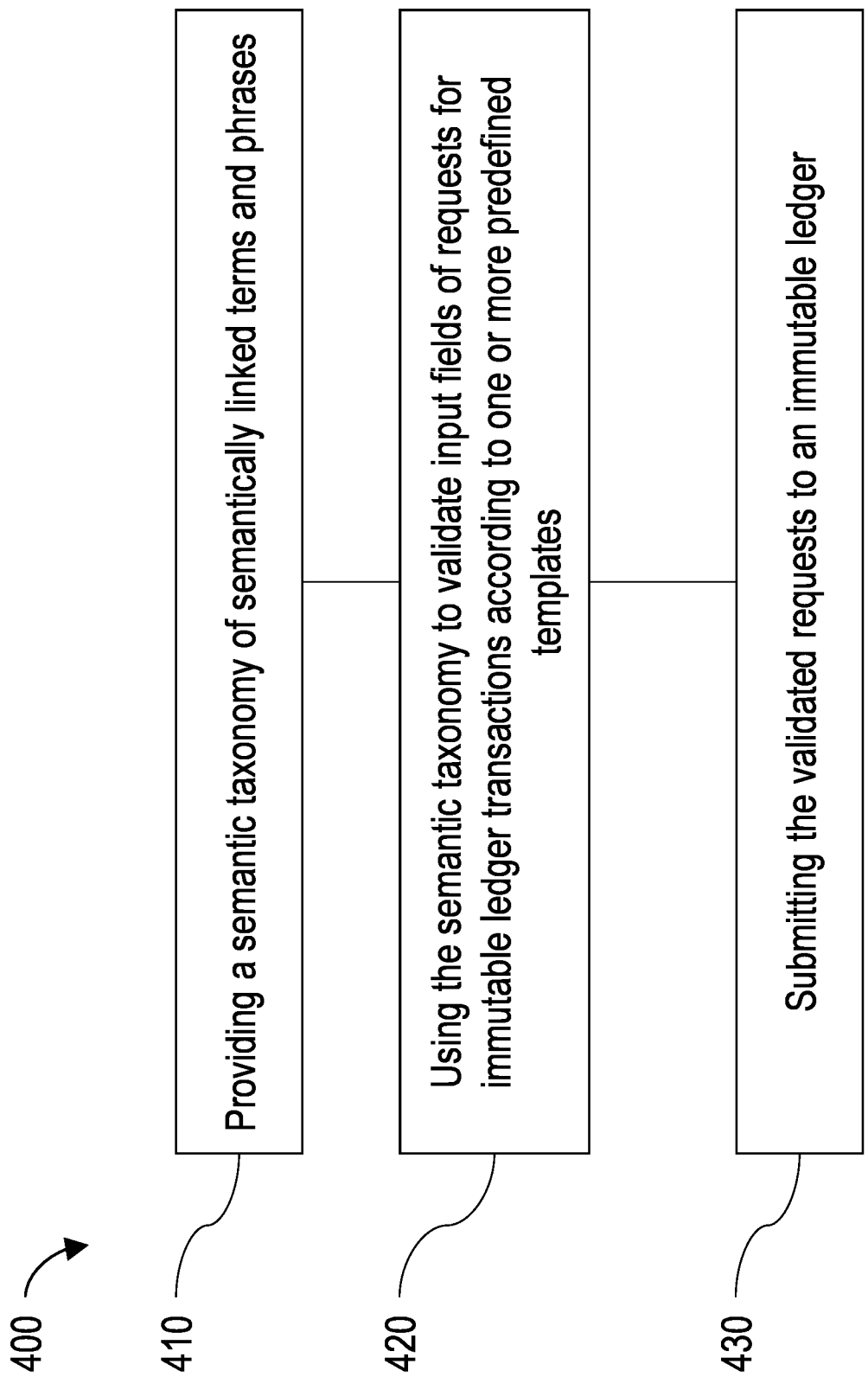
FIG. 4 discloses a flowchart of an example method, in accordance with illustrative embodiments.

FIG. 4 shows a flowchart of an example method 400, in accordance with illustrative embodiments. In example embodiments, the method 400 allows for improved issue handling by identifying similar historical issues as references for a given issue.

In some embodiments, the method 400 can be performed by the present request evaluation system 100, such as using the VM 102. In some embodiments, the system is configured as a middleware or module that is interoperable with various immutable ledger architectures.

In example embodiments, the method 400 includes providing a semantic taxonomy of semantically linked terms and phrases (step 410). In some embodiments, the semantic taxonomy uses a semantic graph. In some embodiments, the semantic taxonomy is structured using RDF. In some embodiments, the semantic taxonomy is configured to maintain contextual relationships between elements in the taxonomy to generate semantically coherent messages. In some embodiments, the semantic taxonomy is extensible to include new nodes, relationships, or substructures without database rebuilding.

In example embodiments, the method 400 includes using the semantic taxonomy to validate input fields of requests for immutable ledger transactions according to one or more predefined templates (step 420). In some embodiments, the input fields of the requests are validated against the semantic taxonomy using semantic links within the taxonomy to determine a context and meaning of phrases within the requests. In some embodiments, validating the input fields of the requests prevents placement of illegal content or malicious data onto the immutable ledger by enforcing use of the predefined templates. In some embodiments, validating the input fields of the requests includes ensuring compliance with the predefined templates. In some embodiments, the requests are received via an application programming interface, the requests include text fields populated with strings, and the input fields are validated by verifying the strings against the semantic taxonomy.

In example embodiments, the method 400 includes submitting the validated requests to an immutable ledger (step 430). In some embodiments, the immutable ledger is a blockchain. In some embodiments, the immutable ledger is distributed.

In example embodiments, the method 400 further includes dynamically updating messages in the requests based on real-time changes in associated data.

While the various steps in the example method 400 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 400 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

E. Processing Platform

At least portions of the present resource evaluation system can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the present resource evaluation. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 5. Although described in the context of the present resource evaluation system, these platforms may also be used to implement at least portions of other information processing systems in other embodiments.

Figure 5:
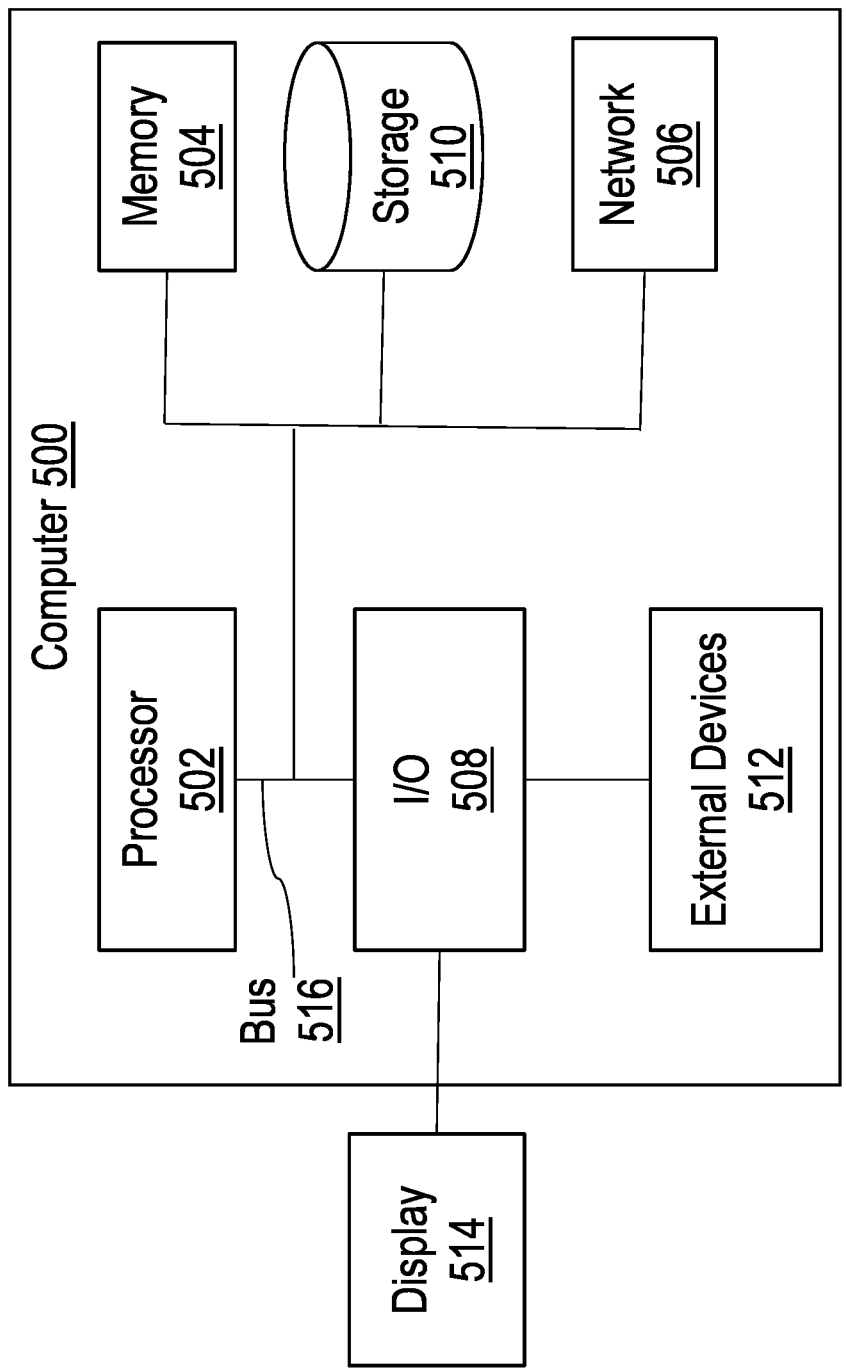
FIG. 5 discloses aspects of a computing entity configured and operable to perform any of the disclosed methods, processes, and operations, in accordance with illustrative embodiments.

FIG. 5 illustrates aspects of a computing device or a computing system in accordance with example embodiments. The computer 500 is shown in the form of a general-purpose computing device. Components of the computer may include, but are not limited to, one or more processors or processing units 502, a memory 504, a network interface 506, and a bus 516 that communicatively couples various system components including the system memory and the network interface to the processor.

The bus 516 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 500 typically includes a variety of computer-readable media. Such media may be any available media that is accessible by the computer system, and such media includes both volatile and non-volatile media, removable and non-removable media.

The memory 504 may include computer system readable media in the form of volatile memory, such as random-access memory (RAM) and/or cache memory. The computer system may further include other removable/non-removable, volatile/non-volatile computer system storage media. By way of example only, the storage system 510 may be provided for reading from and writing to a non-removable, non-volatile magnetic media (not shown and typically called a "hard drive") in accordance with the present request evaluation techniques. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 516 by one or more data media interfaces. As has been depicted and described above in connection with FIGS. 1-4, the memory may include at least one computer program product having a set (e.g., at least one) of program modules that are configured to carry out the functions of the embodiments as described herein.

The computer 500 may also include a program/utility having a set (at least one) of program modules, which may be stored in the memory 504 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 500 may also communicate with one or more external devices 512 such as a keyboard, a pointing device, a display 514, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 508. Still yet, the computer system may communicate with one or more networks such as a local area network (LAN), a general wide area network (WAN), and/or a public network (e.g., the Internet) via the network adapter 506. As depicted, the network adapter communicates with the other components of the computer system via the bus 516. It should be understood that although not shown, other hardware and/or software components could be used in conjunction with the computer system. Non-limiting examples include microcode, device drivers, redundant processing units, external disk drive arrays, RAID systems, tape drives, data archival storage systems, and the like.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

In the foregoing description of FIGS. 1-5, any component described with regard to a figure, in various embodiments of the invention, may be equivalent to one or more like-named components described with regard to any other figure. For brevity, descriptions of these components has not been repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n." This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the embodiments described herein should be limited only by the appended claims.

What is claimed is:

1. A system comprising:
   a memory comprising instructions; and
   a processor configured to execute the instructions, the instructions including:
   providing, by a virtual machine executing on the system, a semantic taxonomy of semantically linked terms and phrases;
   using, by the virtual machine, the semantic taxonomy to validate input fields of requests for immutable ledger transactions according to one or more predefined templates;
   submitting, by the virtual machine, the validated requests to an immutable ledger; and
   causing, by the virtual machine, the immutable ledger to distribute the validated requests to one or more other nodes of the immutable ledger.

2. The system of claim 1, wherein the semantic taxonomy uses a semantic graph.

3. The system of claim 1, wherein the input fields of the requests are validated against the semantic taxonomy using semantic links within the taxonomy to determine a context and meaning of phrases within the requests.

4. The system of claim 1, wherein validating the input fields of the requests prevents placement of illegal content or malicious data onto the immutable ledger by enforcing use of the predefined templates.

5. The system of claim 1, wherein validating the input fields of the requests includes ensuring compliance with the predefined templates.

6. The system of claim 1, wherein the requests are received via an application programming interface, the requests include text fields populated with strings, and the input fields are validated by verifying the strings against the semantic taxonomy.

7. The system of claim 1, wherein the instructions further include dynamically updating messages in the requests based on real-time changes in associated data.

8. The system of claim 1, wherein the semantic taxonomy is structured using a Resource Description Framework (RDF) that is extensible and supports interoperability with external datasets or knowledge bases.

9. The system of claim 1, wherein the semantic taxonomy is configured to maintain contextual relationships between elements in the taxonomy to generate semantically coherent messages.

10. The system of claim 1, wherein the semantic taxonomy is extensible to include new nodes, relationships, or substructures without database rebuilding.

11. The system of claim 1, wherein the system is configured as middleware or a module that is interoperable with various immutable ledger architectures.

12. The system of claim 1, wherein the immutable ledger is a blockchain.

13. The system of claim 1, wherein the immutable ledger is distributed.

14. A method comprising:
  providing, by a virtual machine executing on a server, a semantic taxonomy of semantically linked terms and phrases;
  using, by the virtual machine, the semantic taxonomy to validate input fields of requests for immutable ledger transactions according to one or more predefined templates;
  submitting, by the virtual machine, the validated requests to an immutable ledger; and
  causing, by the virtual machine, the immutable ledger to distribute the validated requests to one or more other nodes of the immutable ledger.

15. The method of claim 14, wherein the semantic taxonomy uses a semantic graph.

16. The method of claim 14, wherein the input fields of the requests are validated against the semantic taxonomy using semantic links within the taxonomy to determine a context and meaning of phrases within the requests.

17. The method of claim 14, wherein the semantic taxonomy is configured to maintain contextual relationships between elements in the taxonomy to generate semantically coherent messages.

18. The method of claim 14, wherein the semantic taxonomy is extensible to include new nodes, relationships, or substructures without database rebuilding.

19. The method of claim 14, wherein the immutable ledger is a blockchain.

20. A non-transitory processor-readable storage medium having stored thereon program code of one or more software programs, wherein the program code when executed by at least one processing device causes the at least one processing device to perform the following steps:
  providing, by a virtual machine executing on a server, a semantic taxonomy of semantically linked terms and phrases;
  using, by the virtual machine, the semantic taxonomy to validate input fields of requests for immutable ledger transactions according to one or more predefined templates;
  submitting, by the virtual machine, the validated requests to an immutable ledger; and
  causing, by the virtual machine, the immutable ledger to distribute the validated requests to one or more other nodes of the immutable ledger.

* * * * *